(12) United States Patent
Uchiyama et al.

(10) Patent No.: US 10,049,839 B2
(45) Date of Patent: Aug. 14, 2018

(54) GAS CIRCUIT BREAKER

(71) Applicant: HITACHI, LTD., Tokyo (JP)

(72) Inventors: Hideaki Uchiyama, Tokyo (JP);
Noriyuki Yaginuma, Tokyo (JP);
Daisuke Nomura, Tokyo (JP);
Hiroyuki Nakamichi, Tokyo (JP); Yuji Kaneko, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/504,837

(22) PCT Filed: Mar. 4, 2015

(86) PCT No.: PCT/JP2015/056283
§ 371 (c)(1),
(2) Date: Feb. 17, 2017

(87) PCT Pub. No.: WO2016/027485
PCT Pub. Date: Feb. 25, 2016

(65) Prior Publication Data
US 2017/0263398 A1 Sep. 14, 2017

(30) Foreign Application Priority Data
Aug. 20, 2014 (JP) ................................. 2014-167088

(51) Int. Cl.
*H01H 33/56* (2006.01)
*H01H 33/64* (2006.01)
(Continued)

(52) U.S. Cl.
CPC ............ *H01H 33/56* (2013.01); *H01H 33/64* (2013.01); *H01H 71/025* (2013.01); *H02B 13/045* (2013.01); *H01H 2223/044* (2013.01)

(58) Field of Classification Search
CPC ........ H01H 33/56; H01H 33/64; H01H 33/91; H01H 71/025; H02B 13/045; H02B 13/035
(Continued)

(56) References Cited

U.S. PATENT DOCUMENTS 5,814,781 A * 9/1998 Koyanagi ............ H01H 33/904
218/60
6,515,248 B2 * 2/2003 Imamura ................ H01H 33/91
218/59
(Continued)

FOREIGN PATENT DOCUMENTS

JP H08-195147 A 7/1996
JP H10-269910 A 10/1998
(Continued)

OTHER PUBLICATIONS

Translation of JP2003217411 (original published Jul. 31, 2003).*
International Search Report for WO 2016/027485 A1, dated May 19, 2015.

*Primary Examiner* — Renee Luebke
*Assistant Examiner* — William Bolton
(74) *Attorney, Agent, or Firm* — Volpe and Koenig, P.C.

(57) ABSTRACT

A gas circuit breaker having a pair of contacts and a pair of exhaust conductors. An exhaust hole in the pair of exhaust conductors is provided with an insulation cover having an opening. The cover has a guide on an opening end on the side near the pair of contacts and an opening end on the side far from the pair of contacts respectively. The guide has an exhaust hole protective guide and a high-temperature gas passage dividing guide. A first gas flow passage is between an exhaust hole protective guide and a high-temperature gas passage dividing guide, and a second gas flow passage is between the high-temperature gas passage dividing guides. The first gas flow passage is narrower than the second gas
(Continued)

flow passage. An end of the exhaust hole protective guide on the first gas flow passage side is projected toward the high-temperature gas passage dividing guide.

9 Claims, 7 Drawing Sheets

(51) Int. Cl.
*H02B 13/045* (2006.01)
*H01H 71/02* (2006.01)

(58) Field of Classification Search
USPC .............................................. 218/155, 57–61
See application file for complete search history.

(56) References Cited

U.S. PATENT DOCUMENTS

| | | | |
|---|---|---|---|
| 7,763,821 B2* | 7/2010 | Yoshitomo | H01H 33/7015 218/59 |
| 2007/0068904 A1* | 3/2007 | Dahlquist | H01H 33/74 218/59 |
| 2010/0147804 A1* | 6/2010 | Yamada | H01H 33/90 218/63 |
| 2013/0168357 A1* | 7/2013 | Yaginuma | H01H 33/08 218/57 |

FOREIGN PATENT DOCUMENTS

| | | |
|---|---|---|
| JP | 2000-268688 A | 9/2000 |
| JP | 2003-217411 A | 7/2003 |
| JP | 2012-129091 A | 7/2012 |

* cited by examiner

GAS CIRCUIT BREAKER

TECHNICAL FIELD

The present invention relates to a gas circuit breaker, and more particularly, to a gas circuit breaker in which insulation performance in an exhaust hole of an exhaust conductor is improved.

BACKGROUND ART

To meet requirements for increase in electric power demand, and downsizing and high reliability of electric power equipment, there is a remarkable tendency that a gas insulated switchgear (hereinbelow, referred to as a "GIS") in which a tank charged with sulfur hexafluoride gas ($SF_6$) having high insulation and breaking performance accommodates electric devices such as an energization conductor and a breaking unit, to attain significant size reduction of the entire switchgear, is a main stream as a recent electric switchgear.

The most important constituent element of the GIS is the breaking unit (hereinbelow, referred to as a "GCB"). The GCB has a structure where the breaking unit is supported via an insulting spacer or an insulating tube in the breaking unit tank charged with the $SF_6$ gas.

This breaking unit quickly breaks not only a general load current but a short circuit current upon accident. At this time, arc-extinguishing gas the temperature of which has become high by arc overheating (hereinbelow, referred to as "high-temperature gas") flows from the exhaust conductor to the tank side, to lower the peripheral insulation performance, and cause ground fault.

As conventional art, one is known in which cooling blades are provided inside an exhaust tube such that high-temperature gas is applied to the cooling blades, to promote stirring of the peripheral low-temperature gas and quickly cool down the temperature of the gas discharged from an exhaust hole, as disclosed in Patent Literature 1.

However, downsizing of the recent GCB is advanced and downsizing of the breaking unit itself is also advanced. The downsizing of the breaking unit is accompanied by downsizing of the exhaust conductor on the fixed side or movable side, or both sides, in many cases. In this situation, it is difficult to provide the cooling blades as described above in the exhaust tube in view of balancing assembling property and arrangement space.

Further, the exhaust hole provided in the exhaust conductor is also used as an assembling hole for connection of a link mechanism of the breaking unit upon assembly. It is necessary that the exhaust hole has a sufficient size for assembly. When the downsizing of the breaking unit is advanced, the size of the exhaust hole is too large with respect to the ratio of the entire breaking unit.

On the other hand, when the exhaust hole is significantly reduced, a problem of reduction of the breaking performance or the like occurs. Further, when the high-temperature gas is discharged from a small exhaust hole, the end of the exhaust hole is likely to be exposed to the high-temperature gas, making it impossible to avoid the degradation of insulation performance.

Even though the breaking unit is downsized, it does not directly affect the reduction of the high-temperature gas caused upon arc extinguishing, but rather the space for cooling the high-temperature gas is reduced. There are many problems in setting of the exhaust hole. When it is not possible to set an appropriate exhaust hole, the degradation of insulation performance between the exhaust conductor and the ground tank becomes a serious problem.

CITATION LIST

Patent Literature

Patent Literature 1: Japanese Unexamined Patent Application

SUMMARY OF INVENTION

Technical Problem

According to the present invention, it is an object to reduce the risk of ground fault and improve the insulation performance of a gas circuit breaker when high-temperature gas caused with arc heating is discharged through an exhaust conductor to the ground tank side.

Solution to Problem

A gas circuit breaker according to the present invention has been made in view of the above problem, and is a gas circuit breaker including: a ground tank charged with extinguishing gas; a pair of contacts provided in the ground tank; and a pair of exhaust conductors electrically connected to the pair of contacts. At least one of exhaust holes provided in the pair of exhaust conductors has an insulation cover. The cover is provided along an opening end of the exhaust hole, and has an opening communicating with the inside of the exhaust conductor.

Advantageous Effects of Invention

With the gas circuit breaker according to the present invention, adopting the above-described exhaust structure, it is possible to prevent the high-temperature gas discharged from the exhaust hole from directly blowing against the end of the exhaust hole which may be an insulation weak part. It is possible to improve the insulation performance of the device.

DESCRIPTION OF EMBODIMENT

Hereinbelow, an embodiment of the present invention will be described with reference to the drawings. The following description is merely an example of implementation, and not intended to limit the content of the present invention to the following particular aspect. The invention itself is implemented as various aspects according to the contents described in the scope of the claims.

First Embodiment

Figure 1:
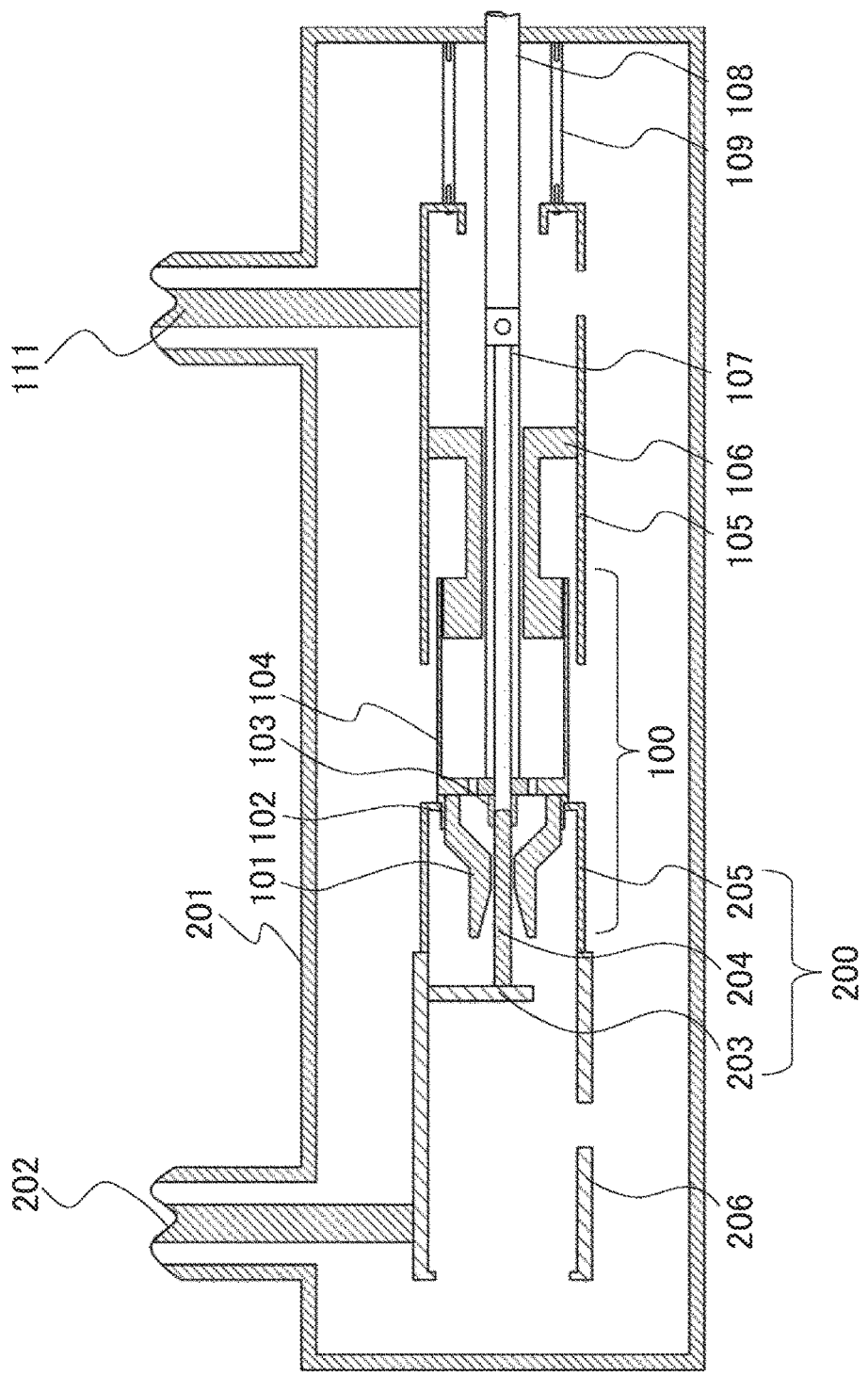
FIG. 1 illustrates an on state of a gas circuit breaker according to the present invention.
Figure 2:
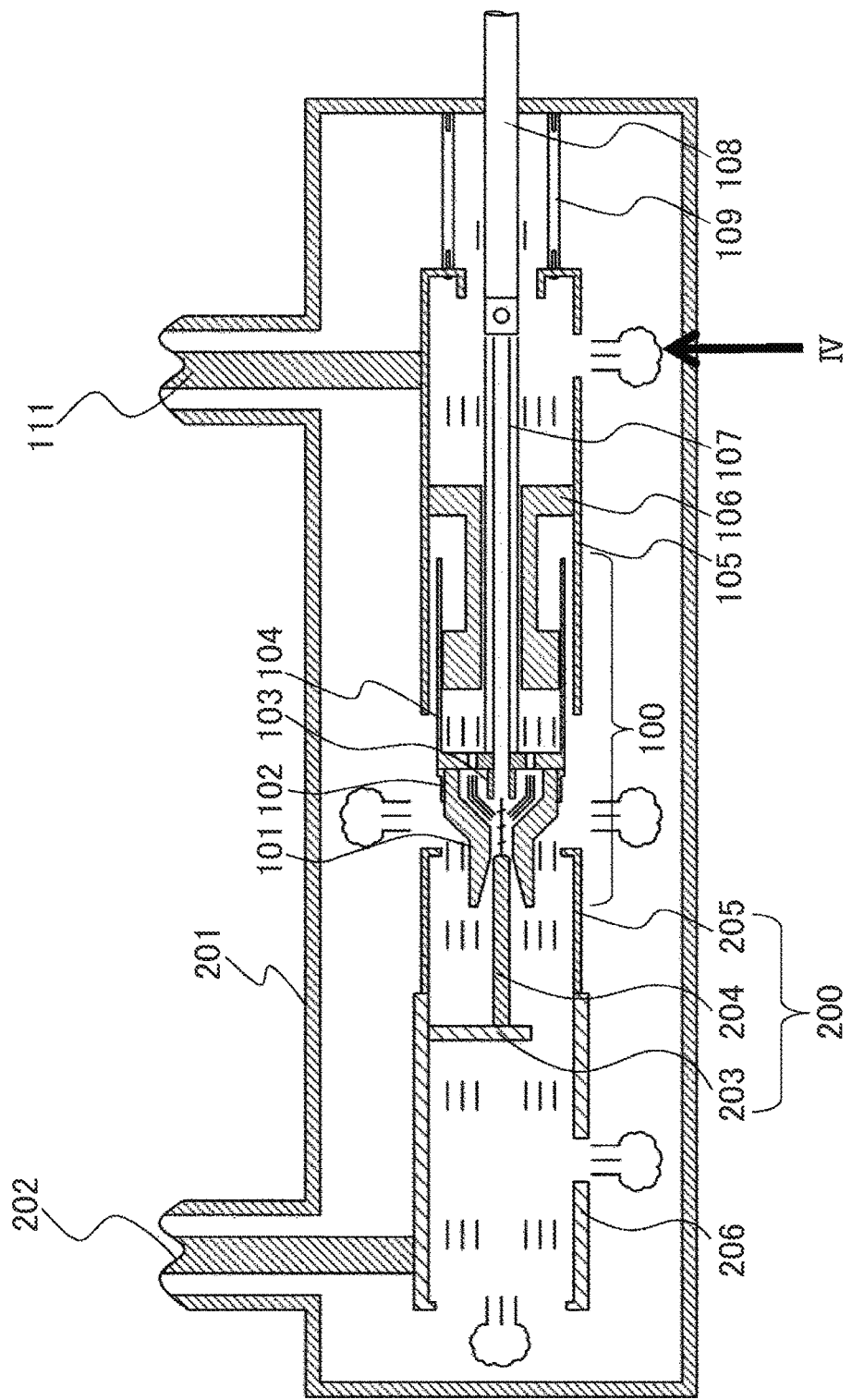
FIG. 2 illustrates a breaking operation state of the gas circuit breaker according to the present invention.
Figure 3:
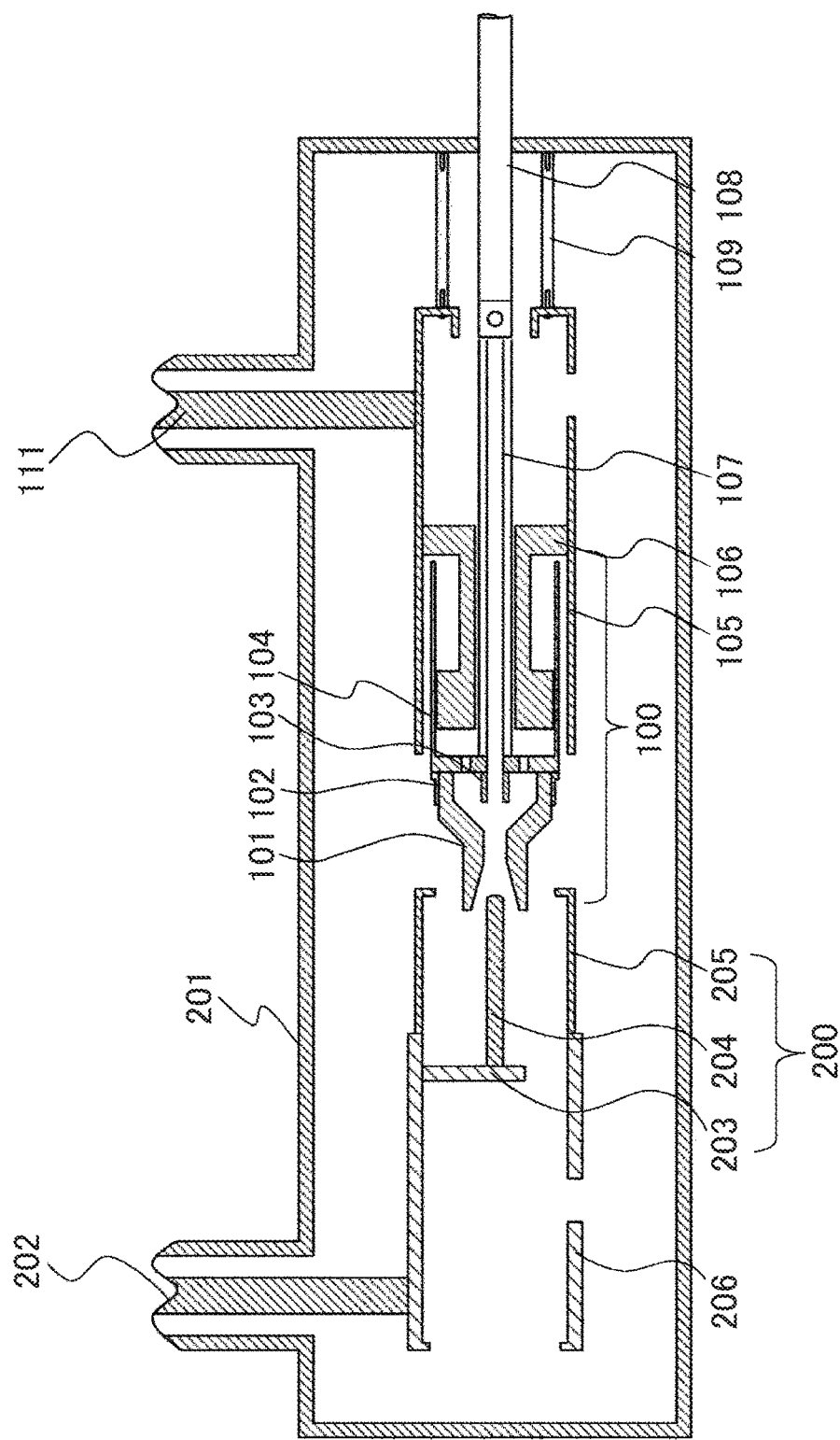
FIG. 3 illustrates a breaking completion state of the gas circuit breaker according to the present invention.

As shown in FIGS. 1 to 3, a ground tank 201 is charged with insulation gas such as $SF_6$ gas. A fixed side energization conductor 202 and a movable side energization conductor 111 are routed in the tank.

The fixed side energization conductor 202 is electrically connected to a fixed side arc contact base 203, a fixed side arc contact 204, a fixed side main contact 205 and a fixed side exhaust conductor 206 constituting the fixed side breaking unit 200.

The movable side energization conductor 111 is electrically connected to a movable side exhaust conductor 105. The movable side exhaust conductor 105 has a puffer piston 106 fixed on its inner periphery. A puffer cylinder 104 is slidably held between the movable side exhaust conductor 105 and the puffer piston 106, and is electrically connected to the movable side energization conductor 111 via the movable side exhaust conductor 105.

A puffer shaft 107 is coaxially provided inside the puffer cylinder 104, and fixed at its end to the puffer cylinder 104. The other end of the puffer shaft 107 is coupled to an insulation operating rod 108. With this configuration, the driving force of an operating unit (not shown) attached to the other end of the insulation operating rod 108 is transmitted to a movable side breaking unit 100.

The end of the movable side breaking unit 100 is formed by coaxially arranging an insulation nozzle 101, a movable side main contact 102, a movable side arc contact 103, and the puffer cylinder 104. The movable side exhaust conductor 105 is fixed to the ground tank 201 with an insulation tube 109.

FIG. 1 shows an operating state (on state) in the system of the gas circuit breaker. FIG. 2 shows a state immediately after breaking of a short current. FIG. 3 shows a breaking completion state after the short current breaking.

When a command current is outputted in the state of FIG. 1, the driving force of the operation unit (not shown) is transmitted to the movable side breaking unit 100 via the insulation operating rod 108. As shown in FIG. 2, the movable side breaking unit 100 is moved to the right side of the drawing. At this time, the extinguishing gas in the puffer cylinder 104 is compressed with the puffer piston 106, and blown to arc occurred between the movable side arc contact 103 and the fixed side arc contact 204. The discharge of the extinguishing gas in the puffer cylinder 104 is continued until the breaking completion state shown in FIG. 3 is attained. The flow of the high-temperature gas on the movable side will be described. The gas passed inside the movable side arc contact 103 flows into the movable side exhaust conductor 105 through an exhaust slit (not shown) of the puffer shaft 107. Then the gas is discharged mainly from an exhaust hole 105a to the ground tank 201. Through the series of operations including arc extinguishing, cooling of the high-temperature gas, and insulation performance maintaining process, the breaking is completed.

Figure 4:
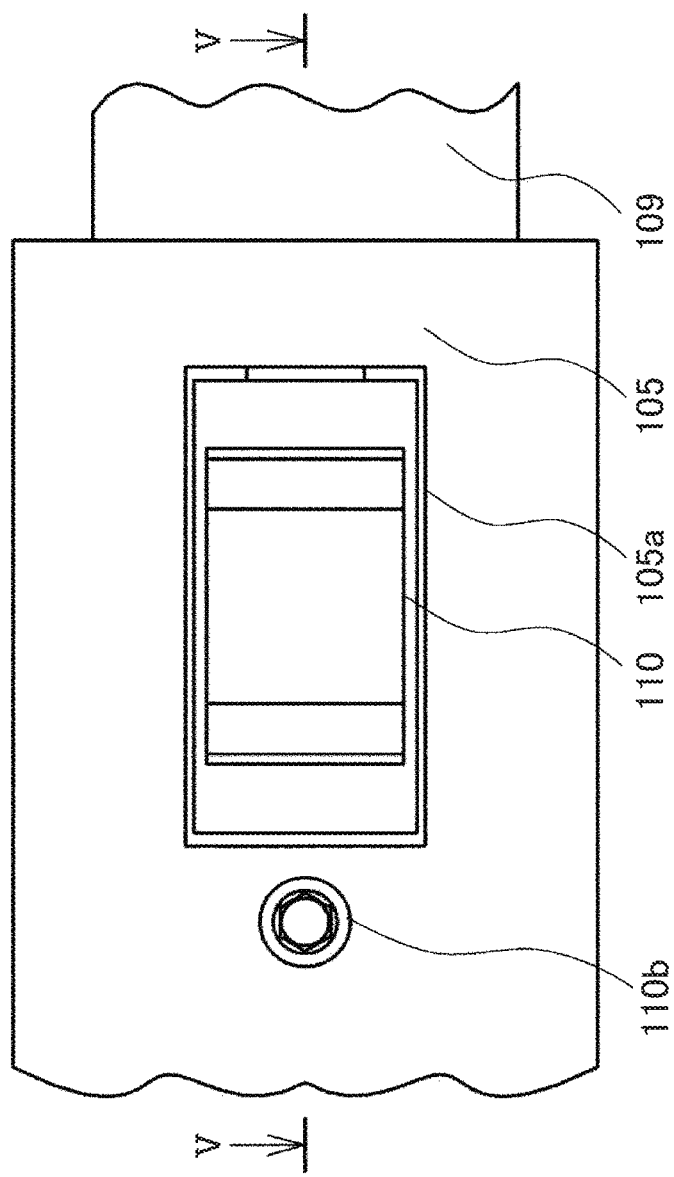
FIG. 4 is an enlarged view of an exhaust structure of the gas circuit breaker according to the present invention viewed from a direction IV in FIG. 2.
Figure 5:
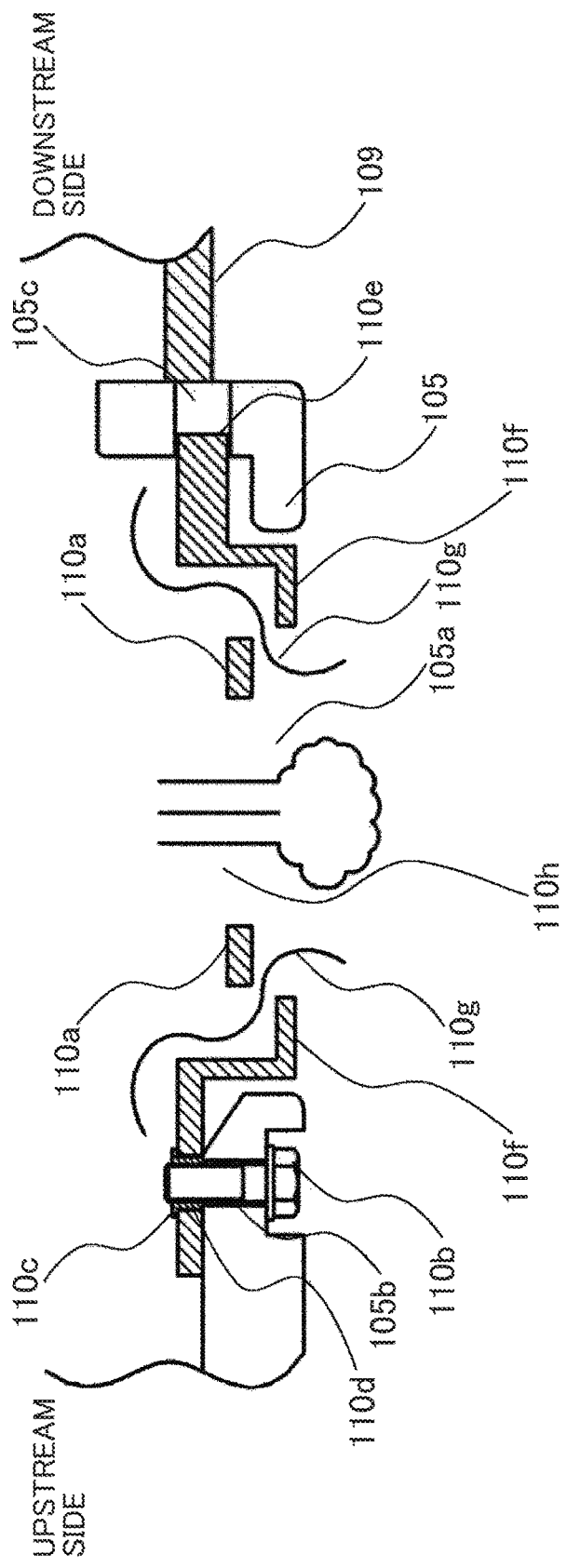
FIG. 5 is a V-V cross sectional view of FIG. 4.
Figure 6:
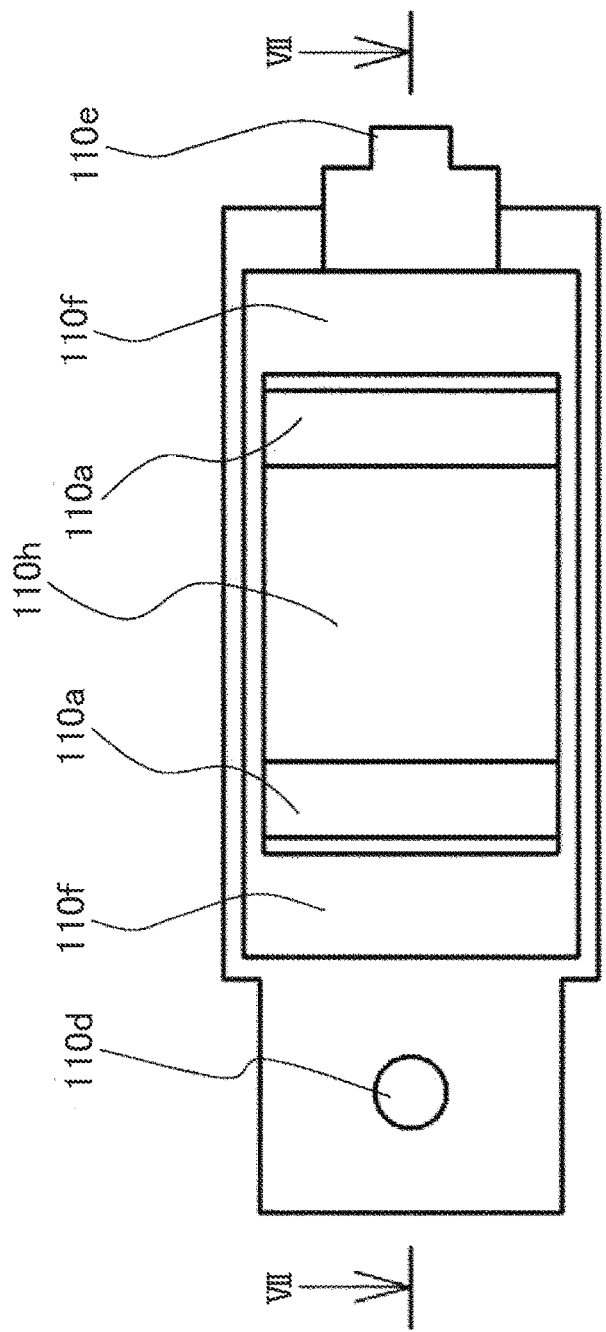
FIG. 6 is an enlarged view of an example of a PTFE cover according to the present invention.
Figure 7:
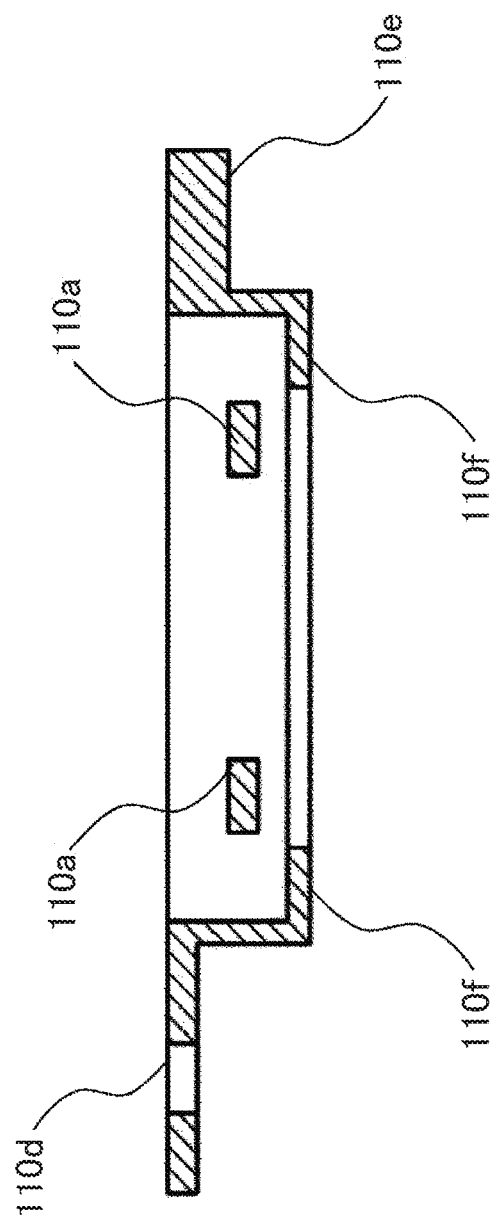
FIG. 7 is a cross-sectional view along a line VII-VII in FIG. 6.

FIG. 4 is an enlarged view along a IV arrow in FIG. 2. The figure shows a state where the exhaust hole 105a of the movable side exhaust conductor 105 is provided with a PTFE cover 110. FIG. 5 is a cross sectional view along a V-V arrow in FIG. 4. This cross-sectional view shows the structure and a fixing method of the PTFE cover 110 according to the present embodiment. FIG. 6 and FIG. 7 are enlarged views of only the PTFE cover 110 according to the present embodiment.

As shown in FIG. 6 and FIG. 7, the PTFE cover 110 has a high-temperature gas passage dividing guide 110a, a cover bolt fastening hole 110d, a cover insertion part 110e, and an exhaust hole protective guide 110f.

The peripheral part of the end of the exhaust hole 105a is opposed to the ground tank and is a high electrical field part. When this part is exposed to the high-temperature gas from the breaking part, it becomes an insulation weak point. The PTFE cover 110 covers the opening peripheral part of the exhaust hole 105a, and has an advantage to prevent the high-temperature gas from directly being applied to the exhaust hole 105a. As a result, it is possible to improve the insulation performance.

Further, in the present embodiment, to obtain a more effective structure, the exhaust hole protective guide 110f is provided at the end of the PTFE cover 110. It has a shape projected to the side to narrow the opening of the PTFE cover along periphery of the exhaust hole 105a. With this shape, the effect of prevention of direct blowing of the high-temperature gas from the breaking part against the end of the exhaust hole 105a is increased, and the insulation performance is further improved. The exhaust hole protective guide 110f, when provided on the entire opening of the PTFE cover, protects the weak point in a balanced manner. Especially when it is provided on the downstream side where the flow of the high-temperature gas is fast or when the size of the protective guide on the downstream side is large, the effect is increased.

In addition to the above configuration, to reduce as much as possible the risk of blowing of the high-temperature gas from the breaking part against the end of the exhaust hole 105a, the PTFE cover 110 has the following structure. As shown in FIG. 5 and FIG. 6, a high-temperature gas passage dividing guide 110a is provided in the vicinity of the exhaust hole protective guide 110f to form a first gas flow passage 110g. In FIG. 5, a second gas flow passage 110h is formed between the two high-temperature gas passage dividing guides 110a. It is configured such that the flow rate of the high-temperature gas from the first gas flow passage 110g is lower than the flow rate of the high-temperature gas from the second gas flow passage 110h, and most of the discharged high-temperature gas is passed through the second gas flow passage 110h.

The high-temperature gas passage dividing guide 110a is arranged such that the flow of the high-temperature gas from the first gas flow passage 110g is directed toward the high-temperature gas discharged from the second gas flow passage 110h. For this purpose, for example, the end of the exhaust hole protective guide 110f on the side of the first gas flow passage 110g is shaped to be projected toward the high-temperature gas passage dividing guide 110a (see FIG. 5). Further, it may be configured such that the side of the exhaust hole protective guide 110f facing the high-temperature gas passage dividing guide 110a has a slope toward the high-temperature gas passage dividing guide 110a, to reduce the flow resistance of the first gas flow passage 110g.

With this configuration, most of the high-temperature gas discharged via the second gas flow passage 110h is affected with the flow of the high-temperature gas from the first gas flow passage 110g. It is possible to reduce as much as possible the risk of flow of the gas to the end of the exhaust hole 105a as a high electrical field part. Further, the extinguishing gas discharged upon current breaking is locally high-temperature gas. When the gas density is lowered even locally, and when it arrives at the high electrical field part, it causes reduction of the insulation performance. The mixture of gas after the division of the gas flow passage into the first and second passages complicates the gas flow inside the movable side exhaust conductor 105, i.e., causes the effect of stir-cooling of the gas discharged from the exhaust hole 105a. As a result, this contributes to downsizing and improvement in the reliability of the device.

Note that it is not necessary to provide two high-temperature gas passage dividing guides 110a. It may be provided only on the far side from the breaking part (the downstream side in FIG. 5), or may be provided only on the near side from the breaking part (the upstream side in FIG. 5) in accordance with necessity. The two first gas flow passages 110g shown in the present embodiment are set with almost the same flow rate. In accordance with configuration of the breaking part, the high-temperature gas is discharged mainly on the downstream side. It is also effective to suppress the flow passage on the downstream side more than the upstream side.

In the present embodiment, the material of the cover is PTFE which is generally used also as a nozzle material exposed to arc, as an example. The gas discharged from the exhaust hole 105a is in a high-temperature state, and thermal resistance is required. Accordingly, the PTFE is one of optimum materials.

Further, as in the case of the relationship between the insulation nozzle 101 and the movable side main contact 102, the surface of the insulating material, even when in the vicinity of the high electrical field part, is in an electric-field relaxed condition. As described above, it is possible to not only suppress the blowing of the high-temperature gas against the high electrical field part with the PTFE cover but improve the insulation performance including electrical property of the insulating material. That is, with a resin material having high insulation performance durable against high-temperature gas, including PTFE, it is possible to attain the guide effect by improvement of shape, and the cooling effect as well as improvement in the insulation performance by the electric field relaxation effect.

Note that as shown in FIG. 5, in the movable side exhaust conductor 105, regarding the high electric field side facing the ground tank 201 side, an appropriate clearance (generally 2 mm or longer) is provided between the movable side exhaust conductor 105 and the cover 110. This is known as a problem of insulation performance degradation called triple junction. Although not shown, similar arrangement is made at the fixing part of the insulation nozzle 101.

As described above, as the material of the cover 110, the PTFE is an example. Since it is not in a position directly exposed to arc, the purity of the PTFE may be lowered. Another insulation resin material durable against the high-temperature gas than the PTFE may be substituted.

Next, the method for fixing the PTFE cover 110 to the movable side exhaust conductor 105 will be described. The movable side exhaust conductor 105 is provided with a bolt hole 105b for bolt-fastening the PTFE cover 110 on the side near the breaking part (the upstream side of the high-temperature gas) (see FIG. 5). Further, it is provided with a cover insertion hole 105c in which the PTFE cover 110 is inserted so as not to be moved on the side far from the breaking part (the downstream side of the high-temperature gas).

The side of the PTFE cover 110 near the breaking part, in which a cover fixing bush 110c is provided with a tap, is fixed with a cover fixing bolt 110b. Since the PTFE is resin, there is a risk of loosening of the bolt even though the cover is provided with a screw. As shown in FIG. 5, the cover fixing bush 110c is provided with a flange, and the PTFE cover 110 is fixed with the flange, to prevent falling of the PTFE cover 110.

In this manner, it is possible to fix the PTFE cover 110 only with the bolt fastening on the side near the breaking part. It is more preferable that the cover insertion part 110e is provided on the side far from the breaking part, and the both ends of the PTFE cover 110 are fixed by fitting the cover insertion part 110e in the cover insertion hole 105c provided in the movable side exhaust conductor 105. Since the high-temperature gas blows against the PTFE cover 110, the tolerance for mechanical strength is increased. It is possible to reduce the risk of falling or breakage of the PTFE cover 110. Note that it is possible to fix the both ends of the PTFE cover 110 to the movable side exhaust conductor 105 with bolts.

In the fixing of the PTFE cover 110, it is necessary to consider size change due to thermal deformation of a resin material, hygroscopicity, gas suction and the like. In the above description, it is realized by appropriately setting the clearance between the cover bolt fastening hole 110d and the cover fixing bush 110c and the clearance between the cover insertion part 110e and the cover insertion hole 105c.

Note that in the above-described embodiment, the movable side exhaust conductor has been explained. However, it is the same regarding the fixed side exhaust conductor. The present invention is applicable to one or both of the movable side exhaust conductor and the fixed side exhaust conductor. Further, the present invention is also applicable to a twin drive system gas circuit breaker.

LIST OF REFERENCE SIGNS

100 . . . movable side breaking part, 101 . . . insulation nozzle, 102 . . . movable side main contact, 103 . . . movable side arc contact, 104 . . . puffer cylinder, 105 . . . movable side exhaust conductor, 105a . . . exhaust hole, 105b . . . bolt hole, 105c . . . cover insertion hole, 106 . . . puffer piston, 107 . . . puffer shaft, 108 . . . insulation operating rod, 109 . . . insulation tube, 110 . . . PTFE cover, 110a . . . high-temperature gas passage dividing guide, 110b . . . cover fixing bolt, 110c . . . cover fixing bush, 110d . . . cover bolt fastening hole, 110e . . . cover insertion part, 110f . . . exhaust hole protective guide, 110g . . . first gas flow passage, 110h . . . second gas flow passage, 111 . . . movable side energization conductor, 200 . . . fixed side breaking part, 201 . . . ground tank, 202 . . . fixed side energization conductor, 203 . . . fixed side arc contact base, 204 . . . fixed side arc contact, 205 . . . fixed side main contact, 206 . . . fixed side exhaust conductor.

The invention claimed is:
1. A gas circuit breaker comprising:
a ground tank charged with extinguishing gas;
a pair of contacts provided in the ground tank; and
a pair of exhaust conductors electrically connected to the pair of contacts,
wherein at least one of exhaust holes provided in the pair of exhaust conductors has an insulation cover, and
wherein the cover is provided along an opening end of the exhaust hole, and has an opening communicating with the inside of the exhaust conductor, and wherein the cover has an exhaust hole protective guide on at least one of the opening end on a side near the pair of contacts and the opening end on a side far from the pair of contacts.

2. The gas circuit breaker according to claim 1, wherein the cover further has a high-temperature gas passage dividing guide.

3. The gas circuit breaker according to claim 2,
wherein the cover has a metal bush at one end, and
wherein the cover and at least one of the pair of exhaust conductors are fastened via the bush.

4. The gas circuit breaker according to claim 3,
wherein the cover has a fitting part at the other end, and
wherein the fitting part is fitted in a fitting part provided in at least one of the pair of exhaust conductors.

5. The gas circuit breaker according to claim 1,
wherein a first gas flow passage is provided between the exhaust hole protective guide and a high-temperature gas passage dividing guide, and a second gas flow passage is provided between the high-temperature gas passage dividing guides,
wherein the first gas flow passage is narrower than the second gas flow passage, and
wherein an end of the exhaust hole protective guide on the first gas flow passage side is shaped to be projected toward the high-temperature gas passage dividing guide.

6. The gas circuit breaker according to claim 5,
wherein the cover has a metal bush at one end, and
wherein the cover and at least one of the pair of exhaust conductors are fastened via the bush.

7. The gas circuit breaker according to claim 6,
wherein the cover has a fitting part at the other end, and
wherein the fitting part is fitted in a fitting part provided in at least one of the pair of exhaust conductors.

8. The gas circuit breaker according to claim 1,
wherein the cover has a metal bush at one end, and
wherein the cover and at least one of the pair of exhaust conductors are fastened via the bush.

9. The gas circuit breaker according to claim 8,
wherein the cover has a fitting part at the other end, and
wherein the fitting part is fitted in a fitting part provided in at least one of the pair of exhaust conductors.

* * * * *